(12) United States Patent
Barrenscheen et al.

(10) Patent No.: US 11,977,508 B2
(45) Date of Patent: May 7, 2024

(54) SERIAL DATA COMMUNICATION WITH IN-FRAME RESPONSE

(71) Applicant: Infineon Technologies AG, Neubiberg (DE)

(72) Inventors: Jens Barrenscheen, Munich (DE); Ansgar Pottbaecker, Grafing (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 17/656,328

(22) Filed: Mar. 24, 2022

(65) Prior Publication Data

US 2022/0327092 A1 Oct. 13, 2022

(30) Foreign Application Priority Data

Apr. 8, 2021 (DE) .......................... 102021108794.5

(51) Int. Cl.
*G06F 13/42* (2006.01)
*G06F 11/10* (2006.01)
*G06F 13/20* (2006.01)
*H04L 1/00* (2006.01)

(52) U.S. Cl.
CPC .......... *G06F 13/4291* (2013.01); *G06F 13/20* (2013.01); *G06F 2213/36* (2013.01)

(58) Field of Classification Search
CPC .. G06F 13/4291; G06F 13/20; G06F 2213/36; G06F 13/4282; G06F 11/1004; G06F 2213/0002; H04L 1/0041; H04L 1/0061
USPC ........................ 710/3, 20–21, 30, 58, 61, 110
See application file for complete search history.

(56) References Cited

U.S. PATENT DOCUMENTS

| | | | |
|---|---|---|---|
| 6,202,105 B1 * | 3/2001 | Gates .................... | G06F 13/385 710/21 |
| 6,557,051 B1 * | 4/2003 | Pastorello ........... | G06F 13/4291 710/61 |
| 7,333,581 B2 * | 2/2008 | Charpentier .......... | H03M 13/37 375/372 |
| 7,496,114 B2 * | 2/2009 | Umezaki ............... | H04L 65/762 370/489 |
| 7,835,397 B2 * | 11/2010 | Clarke .................. | H04L 49/351 370/476 |
| 2004/0094349 A1 * | 5/2004 | Schumacher ......... | B60R 21/013 180/274 |
| 2008/0126638 A1 * | 5/2008 | Lee ...................... | G06F 13/4291 710/110 |
| 2009/0271532 A1 | 10/2009 | Allison et al. | |

(Continued)

*Primary Examiner* — Idriss N Alrobaye
*Assistant Examiner* — Henry W Yu
(74) *Attorney, Agent, or Firm* — Slater Matsil, LLP (57) ABSTRACT

A method for a slave bus and a master bus includes receiving a first frame via a first data channel, wherein the first frame includes at least first header data, first payload data and first checksum. The method further includes implementing a function depending on the header data contained in the received first frame, and generating a second frame including second header data, second payload data, which are determined by the implemented function, and a second checksum. The second checksum is ascertained at least on the basis of the second payload data and the first header data contained in the received first frame. The method also includes transmitting the second frame via a second data channel simultaneously with receiving the first frame via the first data channel.

20 Claims, 3 Drawing Sheets

(56) References Cited

U.S. PATENT DOCUMENTS

2015/0186075 A1* 7/2015 Roberts .................. G06F 3/061
  710/74
2016/0055114 A1* 2/2016 Freiwald ............. G06F 13/4221
  710/110
2016/0098371 A1  4/2016 Murtaza et al.

* cited by examiner

SERIAL DATA COMMUNICATION WITH IN-FRAME RESPONSE

This application claims the benefit of German Patent Application No. 102021108794.5, filed on Apr. 8, 2021, which application is hereby incorporated herein by reference.

TECHNICAL FIELD

The present description relates to the field of frame-based serial data communication via serial data buses such as e.g., SPI (Serial Peripheral Interface), HSSL (High Speed Serial Link), MSB (Microsecond Bus), I2C-Bus (Inter-Integrated Circuit Bus) or the like.

BACKGROUND

Serial data communication is used in a multiplicity of applications. In this regard, for example, data can be transferred by means of serial data transfer for example between two chips arranged on a circuit board, between two circuits within the same chip or else between two separate electronic control units (ECUs). A wide variety of standardized (in some instances also proprietary standards) serial bus systems are known. The SPI bus, for example, is widely used. The designation "bus" indicates that a plurality of signals or lines are required for communication. In the case of an SPI those include a shift clock signal and a data frame indication signal besides the data lines. These two signals determine the data transfer rate of the serially transferred data and the length of the data frames. In the case of an SPI there are variants with different numbers of data lines for each direction. Particularly for applications with high data rates, use is often made of a plurality of data lines for each direction, e.g. 4 or 8. Hereinafter the data lines for each direction are referred to as a data channel, independently of the number of data lines.

In many applications, data are transferred bidirectionally and simultaneously in both directions (Full Duplex), the data usually being transferred in short sequences referred to as data frames (frames for short). A frame comprises an amount of data bits or symbols, where the data bits or symbols can have various meanings. In this regard, for example, one group (often referred to as "field") of data bits/symbols of a frame can represent an identifier. An identifier can identify, inter alia, the sender and/or the destination of the data transfer. In particular, the identifier can represent an address to which data are intended to be written or from which data are intended to be read. Furthermore, the identifier can contain a specific command stipulating what is intended to happen with the data to be transferred (e.g., reading or writing). Another field of a frame can contain e.g. data bits/symbols representing the data to be written or the data read out. Finally, a further field can contain a checksum that allows error detection (and optionally error correction). The checksum can be calculated e.g., by means of cyclic redundancy check (CRC). However, other methods are known as well, such as e.g. error correcting codes (ECC) or the like.

With the use of checksums, the integrity of a frame can be checked only when the frame (including the checksum field) has been completely received, which can lead to problems in the case of known systems that use in-frame responses (IFRs) because a received frame and the frame containing a response to the received frame are transferred in the same time interval. The inventors have set themselves the object of improving known concepts for serial data transfer with IFR.

SUMMARY

The object mentioned is achieved by means of the method as claimed in claims 1 and 12 and also by means of the bus node as claimed in claims 11 and 15. The dependent claims relate to various embodiments and further developments.

In accordance with one exemplary embodiment, a method for a slave bus node comprises receiving a first frame via a first data channel, wherein the first frame comprises at least first header data (e.g., having an identifier or part of an identifier), first payload data and a first checksum. The method further comprises implementing a function depending on the header data contained in the received first frame, and generating a second frame comprising second header data, second payload data, which can be determined by the implemented function, and also a second checksum. The latter is ascertained at least on the basis of the second payload data and the first header data contained in the received first frame. The method furthermore comprises transmitting the second frame via a second data channel simultaneously with receiving the first frame via the first data line.

In accordance with a further exemplary embodiment, a method for a master bus node comprises generating a first frame comprising at least first header data, first payload data and a first checksum, and also transmitting the first frame via a first data channel, and—simultaneously when transmitting the first frame—receiving a second frame comprising second header data, second payload data and also a second checksum. The method further comprises validating the second checksum on the basis of the second payload data and further on the basis of the first header data contained in the generated first frame.

A further exemplary embodiment relates to a bus node (an electronic circuit for a bus node). Accordingly, the bus node comprises a transmitting and receiving device configured to receive a first frame via a first data channel, wherein the first frame comprises at least first header data, first payload data and a first checksum. The bus node furthermore comprises control logic configured to implement a function depending on the first header data contained in the received first frame. A frame encoder of the bus node is configured to generate a second frame which comprises second header data, second payload data, which can be determined by the implemented function, and also a second checksum. The frame encoder is further configured to ascertain the second checksum on the basis of the second payload data and further on the basis of the first header data contained in the received first frame. The transmitting and receiving device is further configured to transmit the second frame via a second data channel simultaneously with receiving the first frame.

BRIEF DESCRIPTION OF THE DRAWINGS

Exemplary embodiments are explained in greater detail below with reference to figures. The illustrations are not necessarily true to scale and the exemplary embodiments are not restricted only to the aspects illustrated. Rather, importance is attached to representing the principles underlying the exemplary embodiments. In respect of the figures.

DETAILED DESCRIPTION OF ILLUSTRATIVE EMBODIMENTS

Figure 1:
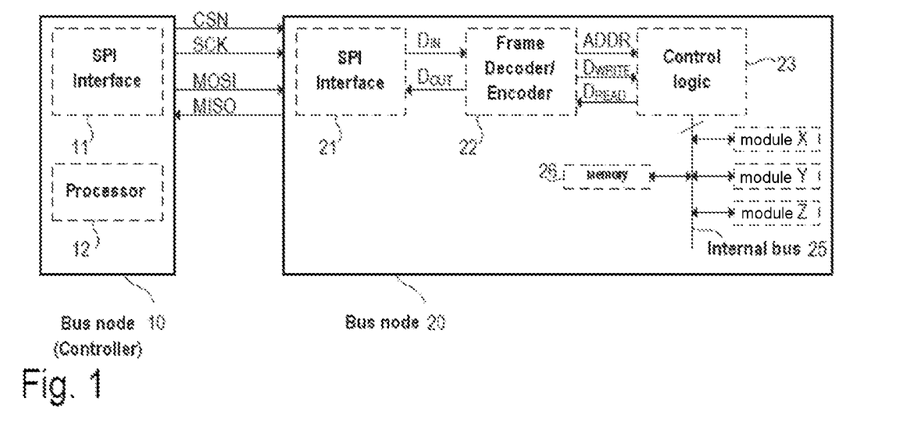
FIG. 1 illustrates one example of a system with two bus nodes connected via an SPI bus.

FIG. 1 illustrates one example of a system with two bus nodes connected via an SPI bus. However, the exemplary embodiments described here are not restricted to an SPI bus, rather the concepts described below can also be applied to any other serial bus systems such as e.g., HSSL (High Speed Serial Link), MSB (Microsecond Bus), I2C-Bus (Inter-Integrated Circuit Bus) or the like.

The bus node 10 shown in FIG. 1 is referred to hereinafter as controller or as master bus node, which controls the bus communication. The bus node 10 can be for example a microcontroller having an SPI interface 11 and at least one processor 12 configured to execute software instructions contained in a memory in order to implement the concepts, functions and method steps described here. Programmable microcontrollers having SPI interface are known per se and are therefore not described in greater detail here. It goes without saying, however, that the bus node 10 need not necessarily have a processor for executing software instructions. In addition or instead, it is also possible to use a hardwired or one-time programmable (OTP) logic.

The SPI interface 11 of the bus node 10 is connected to a corresponding SPI interface 21 of a further bus node 20 via a plurality of bus lines, which in the case of an SPI bus are usually designated by CSN (Chip Select), SCK (Serial Clock), MOSI (Master Out Slave In) and MISO (Master In Slave Out). The signals transferred via the respective bus lines are likewise designated by CSN, SCK, MOSI and MISO. The master bus node stipulates the points in time at which frames are transmitted (activation of CSN) and also the data transfer rate (generation of SCK). Moreover, the master bus node also defines whether data are read or written (as viewed from the master bus node in each case).

In some applications, the signal CSN can be regarded as optional and is used in particular if a plurality of slave bus nodes are connected to a master bus node. In other applications, CSN is indispensable; by way of example, CSN may be incorporated in a safety concept of a component. SCK denotes a shift clock signal, which is output by the master bus node 10 for the synchronization of the data transfer on the data channels MISO and MOSI. The data channel MOSI (having at least one data line) serves for data transfer from the master bus node 10 to the slave bus node 20, and the data channel MISO (having likewise at least one bus line) serves for data transfer in the other direction. In the case of a full-duplex data transfer, data are transferred on both data channels, MOSI and MISO, simultaneously and synchronously with the shift clock signal SCK.

The serial data transfer is usually effected on the basis of frames (MOSI frames from the bus node 10 to the bus node 20; MISO frames from the bus node 20 to the bus node 10). The structure of a frame will be explained in even greater detail later. In the bus node the data $D_{IN}$ received by the SPI interface 21 are forwarded to a frame decoder/encoder 22. In the other direction, the frame decoder/encoder 22 supplies the data $D_{OUT}$ to be transferred to the SPI interface. The frame decoder/encoder 22 is configured firstly to "unpack" and validate the data contained in a MISO frame and to "pack" and safeguard the raw data to be transmitted in a MISO frame.

Validating and safeguarding data contained in a frame usually comprises calculating or verifying a checksum. In the exemplary embodiments described here, the cyclic redundancy check (CRC) is used for calculating and verifying checksums, although other algorithms for ascertaining and verifying checksums are also possible. In the simplest case, the checksum consists of one or more parity bits. Various CRC methods or CRC polynomials and other methods for ascertaining and verifying checksums are known per se and are therefore not explained in detail here. In general, the frame decoder/encoder 22 adds a checksum to those (raw) data $D_{READ}$ which are packed into a frame (to be transmitted), and verifies the checksum contained in a (received) frame in order to check the integrity of the received data (e.g., an address ADDR, $D_{WRITE}$)

In the case of a write access, bus node 10 writes data $D_{WRITE}$ to address ADDR in the bus node 20. For this purpose, $D_{WRITE}$ and ADDR have to be transferred in one or more MOSI frames. In the case of a read access, bus node 10 reads data $D_{READ}$ from an address ADDR of bus node 20. For this purpose, it is necessary to transfer the address ADDR in at least one MOSI frame and the read data $D_{READ}$ in at least one MISO frame. The address ADDR identifies a location in the modules or memory areas of the bus node 20 at which data can be written or read.

In the present example, the data received in a MOSI frame in the (slave) bus node 20 are designated by $D_{WRITE}$ and ADDR and are fed to a control logic 23. The data transmitted in a MISO frame by the bus node 20 are output by the control logic 23 to the frame decoder/encoder 22 and are designated by $D_{READ}$ in the present example. The construction of a frame and the meaning of the data contained therein will be explained in even greater detail later (cf. FIG. 3). The control logic 23 can access a memory 26 and also one or more modules X, Y, Z e.g., via an internal data bus 25. A module can be an arbitrary data source or data sink. In one simple example, a module is a simple semiconductor switch that can be switched on or off by means of a specific command or that supplies on request a value for the current flowing via the (closed) switch. A module can also be a sensor that regularly supplies updated measurement values (e.g., a temperature).

Figure 2:
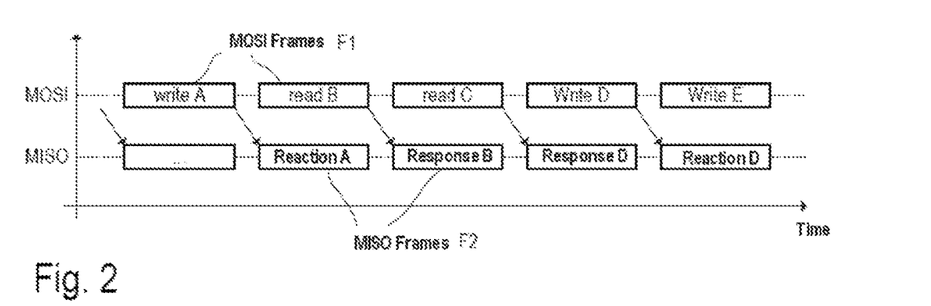
FIG. 2 schematically illustrates frame-based full-duplex bus communication via a serial bus.

FIG. 2 schematically illustrates frame-based full-duplex data transfer via a serial bus, wherein a sequence of frames is in each case transferred both via the MOSI data channel and via the MISO data channel. In the example illustrated, the frames F1 (i.e., the data contained therein) transferred via the MOSI data channel can be interpreted as commands, for example as write and read commands (e.g., "write A", "read B", etc.). The frames F2 transferred via the MISO data channel contain the responses to the respective commands (e.g., the data read out from a register).

The frames F1 and F2 are transferred synchronously with a clock signal (which is generated by the bus node 10 and output to the SCK line) and simultaneously. In the examples described here, "simultaneously" is understood to mean that the two frames (from and to the master) overlap at least temporally. In one exemplary embodiment, in a specific time interval in which a MOSI frame is transferred, a MISO frame is also transferred simultaneously. Particularly in the case of an SPI, the transfer is isochronous since both frames (apart from avoidable propagation delay effects) begin and end substantially at the same point in time.

In systems with a next-frame response (NFR) structure, therefore, the response to a command transferred in a MOSI frame is only transferred in a temporally succeeding MISO frame. The MISO frames F2 lag behind the corresponding MOSI frames F1 temporally by at least one frame duration. This time offset is undesired in some applications, however, for which reason a concept known as in-frame response (IFR) was developed. One example of this is illustrated in FIG. 3.

Figure 3:
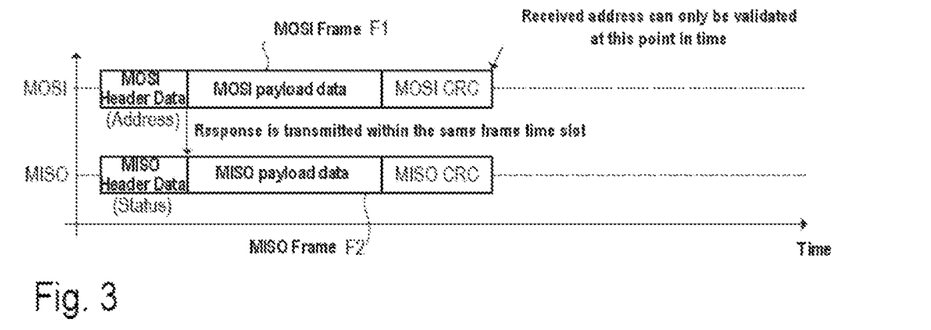
FIG. 3 schematically illustrates the concept of the in-frame response (IFR) in frame-based serial bus communication.

As illustrated in FIG. 3, each frame (MOSI and MISO frames) comprises at least a first field with header data, a second field with payload data and a third field with a checksum. The slave bus node (e.g., bus node 20) can implement a specific function depending on data contained in a MOSI frame F1. Said function can be dependent e.g., on the header data. By way of example, the header data designates an address (e.g., a register address) for a write or read operation. A portion of the header data (just one bit in a simple case) indicates whether a write or read operation is to be implemented. However, the information concerning the function/operation to be implemented can also be considered as part of the address. In the case of a write operation, the data to be written are in the payload data field of the MOSI frame F1. In the case of a read operation, the payload data of the MOSI frame F1 can also be dummy data (e.g., a sequence of zeros). The checksum in the checksum field of the MOSI frame F1 (MOSI CRC) safeguards the data of the MOSI frame that are contained in the header field and in the payload field. That means for the example illustrated that the CRC checksum (MOSI CRC) is calculated in the master bus node 10 on the basis of the header data and the payload data.

In the case of an in-frame response, the slave bus node 20 already implements the function (e.g., a read operation) requested by the master bus node as soon as the header data of the MOSI frame F1 have been received. The MOSI CRC has not yet been evaluated at this point in time. The response (e.g., the data $D_{READ}$ read from a register at the location ADDR), is sent in the payload field of the MISO frame F2 while the corresponding MOSI frame F1 is still being received. The header data of the MISO frame F2 can be dummy data (e.g., a sequence of zeros), on which currently received MOSI header data are dependent, or can be e.g., status information indicating the current status of the bus node 20 (e.g., independently of the currently implemented operation). In one example, the header data (ADDR) currently received in the MOSI frame F1 are copied bit by bit into the header data field of the MISO frame F2 (status information identical to MOSI header data). The checksum in the checksum field of the MISO frame F2 (MISO CRC) protects the payload data of the MISO frame F2 and optionally also the header data of the MISO frame F2. That means for the example illustrated that the CRC checksum (MISO CRC) is calculated in the slave bus node 20 (e.g., in the frame decoder/encoder 22) on the basis of the payload data and optionally also on the basis of the header data of the MISO frame F2.

It can already be discerned from the temporal sequence illustrated in FIG. 3 that at the point in time at which the slave bus node 20 has received the header data (e.g., the address ADDR for a read operation) of the MOSI frame F1, the requested function (e.g., the read operation) must be implemented immediately even before objectively there is a possibility of verifying the checksum (MOSI CRC) in order to validate the data received by the slave bus node 20. At a point in time at which the frame decoder/encoder 22 in the slave bus node 20—possibly—establishes that the received frame F1 is erroneous, the frame F2 with the response has already been transmitted back to the master bus node 20. In the case where the verification of the checksum (MOSI CRC) fails (e.g., as a result of a transfer error of the read address ADDR), the slave bus node 20 would only notice afterward that the response to an "incorrectly understood question" has been transmitted. However, only with the next MISO frame F2 is the slave bus node 20 able to inform the master bus node 10 about the erroneous checksum, which would at least partly nullify again the advantage of the in-frame response. In the following FIGS. 4 and 5 a novel concept is elucidated which makes it possible that the master bus node 10, already on the basis of that MISO frame which contains the in-frame response, can assess whether the slave bus node 20 has performed the correct function (and has "correctly understood" the question).

Figure 4:
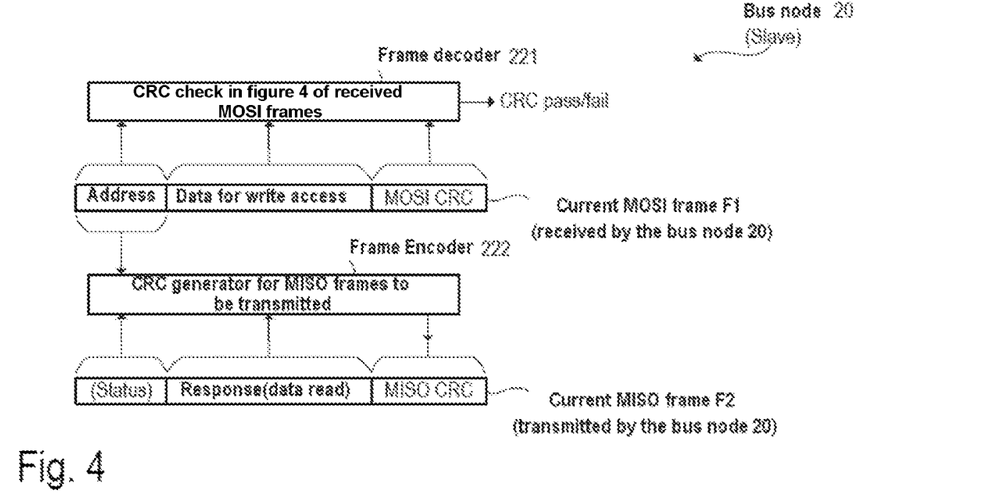
FIG. 4 illustrates one example of a method—implemented in a slave bus node—for safeguarding the response frames by means of checksums with the use of in-frame responses.

FIG. 4 illustrates the process of verifying the checksum (MOSI CRC) contained in the MOSI frame F1 and also generating/calculating the checksum (MISO CRC) to be transmitted in the MISO frame F2 in a slave bus node 20 (cf. FIG. 1). The frame decoder/encoder 22 contained in the bus node 20 can be functionally divided into two parts, which are designated hereinafter as frame decoder 221 and frame encoder 222. The frame decoder 221 receives the data $D_{IN}$ of a received MOSI frame and extracts therefrom the header data (e.g., address ADDR for write access), payload data (e.g., the data word $D_{WRITE}$ to be written) and checksum (MOSI CRC) contained therein. The frame decoder 221 is further configured to verify the received checksum. If a checksum error is detected, then e.g. a process of writing to an address is not performed, but for example a predetermined value is indicated in an error register. During the verification of the checksum, the latter is calculated on the basis of the header data and the payload data of the received MOSI frame F1 and is compared with the received checksum in the checksum field. In the event of deviations between the calculated checksum and the received checksum, an error is signaled. The complete check and the process of writing with data that are safeguarded (by means of CRC) can only take place after the complete MOSI frame has been received (e.g., after the deactivation of the CSN signal).

In the present example, before implementing the write operation, the content of the addressed register is read out (data word $D_{READ}$) and the data word $D_{READ}$ read is sent as an in-frame response to the write command back to the bus node 10 (master node). Directly after receiving the destination address ADDR in the MOSI header data field (still before the check of the MOSI CRC), the control logic 23 performs a read operation at the received address ADDR and transfers the data read there to the frame encoder 222. The frame encoder 222 receives the data word $D_{READ}$ (e.g., from the control logic 23) and also status information and generates therefrom the MISO/response frame F2 to be transmitted, wherein the MISO header data represent the status information and the MISO payload data represent the data word $D_{READ}$. The frame encoder 222 is configured to calculate a checksum on the basis of the MOSI header data (address) of the presently received MOSI frame F1, the MISO payload data of the presently current MISO frame F2 and optionally also on the basis of the MISO header data of the presently current MISO frame F2. The calculated checksum value MISO CRC is written into the checksum field of the current MISO frame F2 and transferred via the bus to the master bus node 10. As already mentioned, the received MOSI frame F1 and the response frame F2 (MISO frame) are transferred in parallel in the same time slot. In the case of a SPI interface, the MOSI and MISO frames are transferred in parallel (in a manner controlled by the common signals CSN and SCK). In the case of other transfer interfaces, MOSI and MISO frames can be transferred with a temporal offset relative to one another. As soon as a slave bus node initiates an action in response to an only partly received MOSI frame (still before the check on the complete MOSI frame), it is possible to apply the mechanisms described here for safeguarding the MISO frame.

In contrast to known concepts, the header data contained in the presently received MOSI frame F1 are taken into account—as illustrated schematically in FIG. 4—in the responding slave bus node 20 during the calculation of the checksum 4 safeguarding the MISO/response frame F2. In this case, the slave bus node uses data for creating the MISO checksum which originate from the current frames from two different transmitters which are transferred at the same time or in an overlapping manner.

Figure 5:
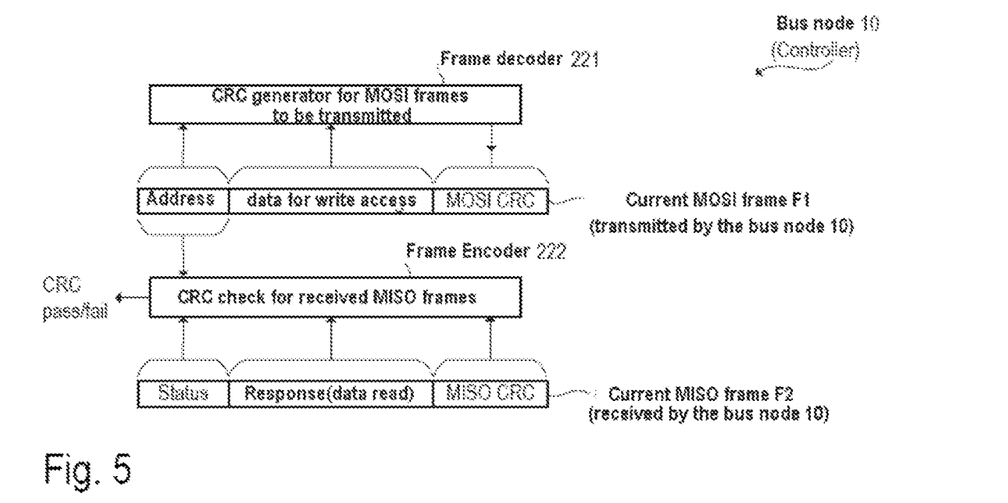
FIG. 5 illustrates one example of a method—implemented in a master bus node—for checking the checksum contained in a response frame with the use of in-frame responses.

The master bus node 10 receives by way of its SPI interface 11 (see FIG. 1) a MISO/response frame F2 (data $D_{OUT}$ r transmitted by the slave bus node) and implements the verification of the checksum (MISO CRC) contained in the received MISO/response frame F2, on the basis of the MOSI header data (address) that were used previously for generating the MOSI frame F1 transferred at the same time as the MISO frame F2 or in a manner overlapping the latter, and also on the basis of the MISO payload data of the presently received MISO/response frame F2 and optionally on the basis of the MISO header data of the presently received MISO/response frame F2. This is illustrated in the lower part of FIG. 5. The upper part of FIG. 5 illustrates the safeguarding of a MOSI frame F1 to be transmitted in the master bus node 10, for which the checksum (MOSI CRC) is calculated on the basis of the MOSI header data (address) and the MOSI payload data of the relevant frame in a conventional manner.

During the verification of the checksum of the received MISO/response frame F2, the master bus node 10 can already recognize whether the slave bus node 20 has correctly received the MOSI header data (which contain e.g., the address for a write or read operation) of the corresponding MOSI frame F1. If that were not the case, the header data (of the MOSI frame F1) received in the slave bus node 20 would not be the same as those used for the generation of the MOSI frame in the master bus node 10 (in this case, the slave bus node 20 would have "incorrectly understood" the master bus node 10). Since the received MOSI header data are taken into account in the checksum calculation in the slave bus node and the intended MOSI header data are taken into account in the checksum verification in the master bus node, during the verification of the checksum of a received MISO/response frame the master bus node can immediately recognize whether the slave bus node 20 has correctly received the header data of the corresponding MOSI frame (and thus the information about the function/operation to be performed).

Figure 6:
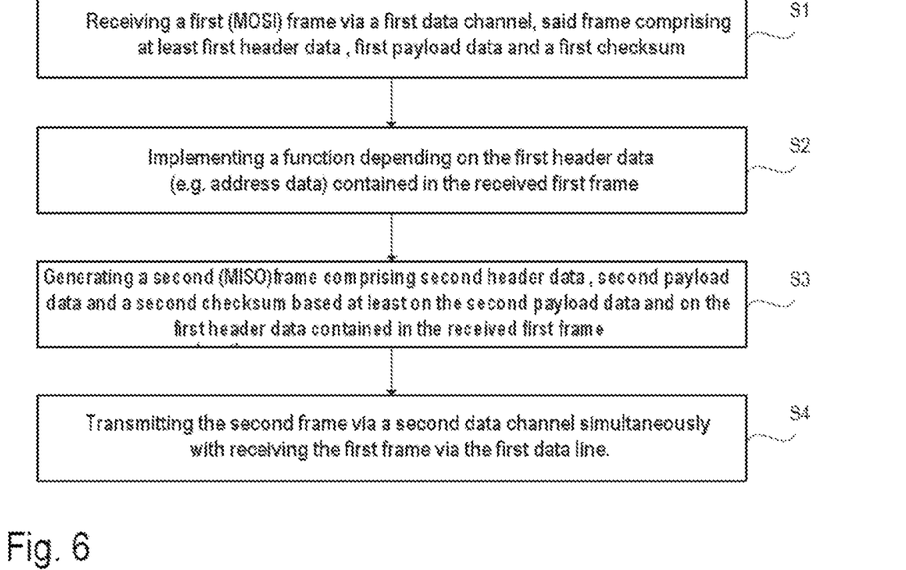
FIG. 6 is a flow diagram for exemplary illustration of a method for a slave bus node.

One example of the concept described here is summarized below with reference to the flow diagrams in FIGS. 6 and 7. The flow diagram in FIG. 6 illustrates a method for a slave bus node (cf. FIG. 1, bus node 20). Accordingly, the method comprises receiving a first frame (MOSI frame) via a first data channel (MOSI data channel). Said MOSI frame contains at least first header data, first payload data and a first checksum (see FIG. 6, step S1). The method further comprises implementing a function depending on the header data contained in the already received part of the first frame (see FIG. 6, step S2) and generating a second frame (response/MISO frame). The latter contains second header data, second payload data, which are determined by the implemented function (e.g., a read operation), and also a second checksum. Said second checksum is ascertained at least on the basis of the second payload data and the first header data contained in the presently received MOSI frame (see FIG. 6, step S3). Furthermore, the method comprises transmitting the MISO frame via a second data channel simultaneously with receiving the MOST frame via the first data channel (see FIG. 6, step S4).

The second header data can additionally also concomitantly influence the second checksum in order to completely safeguard the MISO frame by means of the checksum. Since the header data of the presently received MOSI frame also concomitantly influence the checksum calculation, the master bus node (cf. FIG. 1, bus node 10) upon receiving the response/MISO frame, can check whether the slave bus node has correctly received the header data of the MOSI frame.

The MISO frame is transmitted in the same time interval in which the MOSI frame is received (simultaneously, i.e. in the same time interval or in an overlapping manner). The payload data of the MISO frame can therefore represent an in-frame response to the MOSI frame. In the case of an SPI interface, the MOSI frame and the MISO frame are usually received and respectively transmitted synchronously with a common clock signal. The abovementioned function implemented by the slave bus node can comprise a memory access, wherein the header data of the MOSI frame contain the address of a memory element which is accessed during the implementation of the function in the slave bus node. The function can be in particular a read or write operation. In the case of a read operation, the payload data in the response frame (MISO frame) can be the data read or can be dependent thereon. In the case of a write operation, the payload data in the received MOSI frame are the data to be written to the memory or the data to be written to the memory are dependent on the payload data of the received MOSI frame. Before the write access, the content (overwritten later) of the memory can be read and can be sent back as an in-frame response to the master bus node. Alternatively, the payload data of the response frame can also identify the transmitting (slave) bus node or include status information. The status information transmitted back can also contain the previously received address.

When the MOSI frame has been completely received by the slave bus node, the first checksum contained in the MOSI frame can be validated on the basis of the received first header data and the received first payload data. At this point in time, the function initiated by the MOSI frame has already been performed and the corresponding data as an in-frame response have already been completely transferred back to the master bus node, or their transfer has begun.

Figure 7:
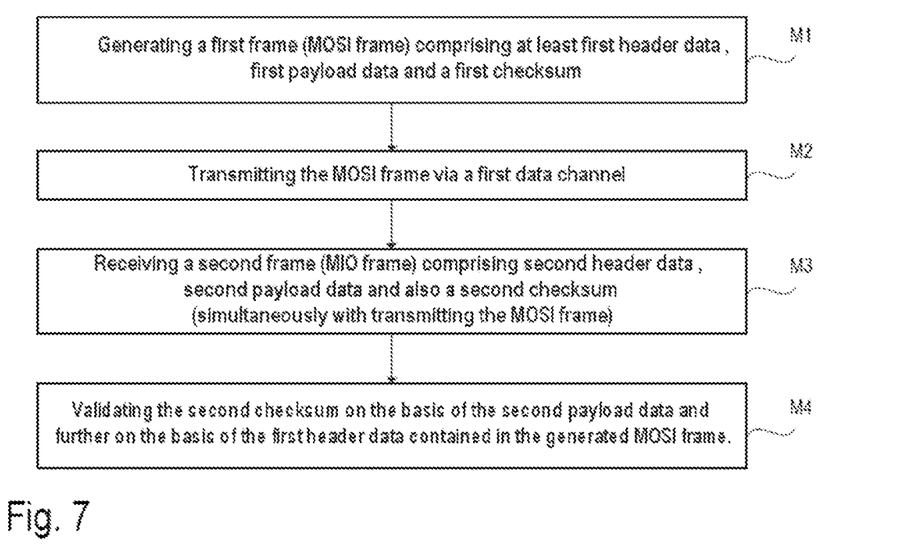
FIG. 7 is a flow diagram for exemplary illustration of a method for a master bus node.

The flow diagram in FIG. 7 illustrates a corresponding method for a master bus node. The method accordingly comprises generating a first frame (MOSI frame) comprising at least first header data, first payload data and a first checksum (see FIG. 7, step M1). The method further comprises transmitting the MOSI frame via a first data channel (see FIG. 7, step M2) and—simultaneously with (in parallel with), or with a slight time offset with respect to, transmitting the MOSI frame—receiving a second frame (MISO frame) comprising second header data, second payload data and also a second checksum (see FIG. 7, step M3). Furthermore, the method comprises validating the second checksum in the master bus node on the basis of the second payload data and further on the basis of the first header data contained in the previously generated MOSI frame (data intended for transfer) (see FIG. 7, step M4). In one exemplary embodiment, during the validation of the second checksum, the second header data can also be taken into account (provided that they are also taken into account in the slave bus node).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic communication method comprising:
   receiving, via a serial data interface at a first bus node comprising a first interface controller, a first frame via a first data channel using clocked data transfer via the serial data interface from a second bus node to the first bus node, wherein the second bus node comprises a second interface controller using the clocked data transfer, wherein the first frame comprises first header data, first payload data and a first checksum; and
   responsive to receiving a portion of the first frame, executing, at the first bus node, a function to generate second header data and second payload data based at least on a portion of the first header data;
   generating, at the first bus node, a second frame comprising the second header data, the second payload data, and a second checksum calculated using the second payload data and the first header data simultaneously while the first frame is received; and
   transmitting, from the first bus node to the second bus node using the clocked data transfer from the first interface controller to the second interface controller via a second data channel different from the first data channel, the second frame simultaneously while receiving the first frame via the first data channel.

2. The method of claim 1, wherein the second frame is transmitted while the first frame is being received.

3. The method of claim 1,
   wherein the clocked data transfer is a synchronous clocked data transfer using a clock signal generated by the second interface controller at the second bus node.

4. The method of claim 1,
   wherein the portion of the first header data comprises a memory address of a memory included with the first bus node, and wherein the function accesses the memory address.

5. The method of claim 4,
   wherein the function accessing the memory address further comprises reading first data from the memory address, and wherein the second payload data are dependent on the first data.

6. The method of claim 5,
   wherein the function accessing the memory address further comprises writing second data to the memory address, and wherein the second data are associated with the first payload data.

7. The method of claim 6,
   wherein the first data are read before the second data are written, and wherein the first data are associated with the second payload data.

8. The method of claim 1,
   wherein the second payload data comprise at least one of: an identifier for the first bus node; and status information.

9. The method of claim 1, further comprising:
   validating, at the first bus node, the first checksum based on the first header data and the first payload data.

10. A first bus node for electronic communication, the first bus node comprising:
    a first interface controller configured to receive a first frame via a first data channel from a second interface controller at a second bus node via a serial data interface, wherein the first frame comprises first header data, first payload data and a first checksum;
    a control logic configured to execute a function associated with the first header data, wherein the function is executed simultaneously while the first frame is received; and
    a frame encoder configured to generate a second frame further comprising second header data, second payload data, and a second checksum, and further configured to calculate the second checksum based on the second payload data and the first header data; and
    wherein the first interface controller is further configured to transmit the second frame to the second interface controller via a second data channel different from the first data channel simultaneously while receiving the first frame via the first data channel.

11. An electronic communication method comprising:
    sending, via a serial data interface from a second bus node comprising a second interface controller, a first frame via a first data channel using clocked data transfer via the serial data interface to a first bus node, wherein the first bus node comprises a first interface controller using the clocked data transfer, wherein the first frame comprises first header data, first payload data and a first checksum; and
    responsive to sending a portion of the first frame, receiving, at the second bus node from the first bus node using the clocked data transfer from the first interface controller to the second interface controller via a second data channel different from the first data channel, a second frame simultaneously while sending the first frame, wherein the second frame comprises second header data, second payload data, and a second checksum calculated using the second payload data and the first header data simultaneously while the first frame is being sent.

12. The method of claim 11, further comprising:
    validating, at the second bus node, the second checksum using the second payload data, and the first header data.

13. The method of claim 11, wherein the second frame is received while the first frame is being transmitted.

14. The method of claim 11, wherein the clocked data transfer is a synchronous clocked data transfer using a clock signal generated by the second interface controller at the second bus node.

15. The method of claim 11, wherein the second payload data comprise at least one of:
    an identifier for the first bus node; and status information.

16. Non-volatile memory media storing instructions executable by a processor of a communication bus node, the instructions enabled to cause the communication bus node to execute the method of claim 11 as the second bus node.

17. Non-volatile memory media storing instructions executable by a processor of a communication bus node, the instructions enabled to cause the communication bus node to execute the method of claim 1 as the first bus node.

18. A second bus node for electronic communication, the second bus node comprising:

at least one processor having access to memory media storing instructions executable by the processor to:

send, via a serial data interface comprising a second interface controller accessible to the processor, a first frame via a first data channel using clocked data transfer via the serial data interface to a first bus node, wherein the first bus node comprises a first interface controller using the clocked data transfer, wherein the first frame comprises first header data, first payload data and a first checksum; and responsive to sending a portion of the first frame, receiving, at the second bus node from the first bus node using the clocked data transfer from the first interface controller to the second interface controller via a second data channel different from the first data channel, a second frame simultaneously while sending the first frame, wherein the second frame comprises second header data, second payload data, and a second checksum calculated using the second payload data and the first header data simultaneously while the first frame is being sent.

19. The second bus node of claim 18, wherein the instructions further comprise instructions to:

validate, at the second bus node, the second checksum using the second payload data, and the first header data.

20. The second bus node of claim 18, wherein the instructions further comprise instructions to:

receive the second frame while the first frame is being transmitted.

* * * * *